April 23, 1929.  W. E. TORFS  1,709,963
COMBINED TYPEWRITING AND COMPUTING MACHINE
Filed April 14, 1922
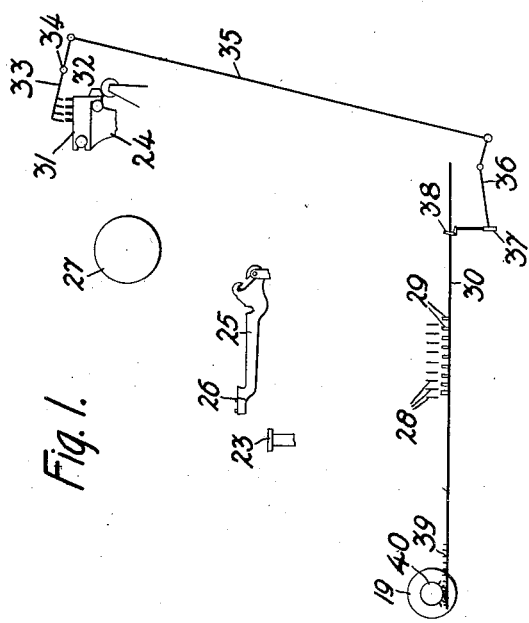
Inventor:
Walter E. Torfs
by O. C. Stickney
Attorney Patented Apr. 23, 1929.

1,709,963

UNITED STATES PATENT OFFICE.

WALTER E. TORFS, OF JERSEY CITY, NEW JERSEY, ASSIGNOR, BY MESNE ASSIGNMENTS, TO ELLIOTT-FISHER COMPANY, OF NEW YORK, N. Y., A CORPORATION OF DELAWARE.

COMBINED TYPEWRITING AND COMPUTING MACHINE.

Application filed April 14, 1922. Serial No. 552,608.

This invention relates to combined typewriting and computing machines, and more particularly to means whereby, in addition to computing the amount of material purchased or consumed, the cost of said amount will be computed and the corresponding reading displayed.

As herein disclosed, the invention is illustrated in connection with an Underwood-Hanson bookkeeping machine for preparing the bills of a public utility company selling gas at the rate of $1.00 per thousand cubic feet.

Each bill or work-sheet is provided with four zones in which entries are to be made in connection with the actuation of the computing mechanism, two of these zones or columns being designated by "Present" and "Previous" to indicate that the readings of the meter are to be typed therein, and the other two being designated by "Consumption" and "Amount", and being intended to have typed therein, respectively, the difference between the meter readings and the charge for the amount consumed.

The typing and computing mechanisms are combined in a way to simplify the making out of a bill for gas consumption or other purposes. The bill is divided into zones, and it is only necessary to copy an amount into each zone; no mental computation being demanded. The first number so copied denotes the total number of cubic feet of gas that have been delivered. In the second zone is copied the number of cubic feet which have been previously paid for. In the main register, one of these amounts is automatically subtracted from the other, and hence the register shows the difference. This difference is now copied in the third zone on the work-sheet. At the same time there is automatically ascertained the amount, in dollars and cents, which constitutes the correct charge for the consumed gas, thereby avoiding liability of error which would occur in mental computation. This ascertained amount appears in and is copied from a special register into the fourth zone on the work-sheet. Said registers are automatically cleared during the foregoing operation. An additional register is provided in which automatically to accumulate the charges; and another register in which are accumulated automatically the quantities delivered.

The mechanism may be set for addition in the first column, subtraction in the second, subtraction in the third, and addition in the fourth. Four registers are provided, the first at the left being used to accumulate the numbers written in the "Consumption" column, the second or main register being used to compute the numbers which later are written in the "Consumption" column, the third or computing register being used to compute the amount afterwards written in the "Amount" column, and the fourth being used to accumulate the numbers of the charges written in the "Amount" columns of various bills. The dial-wheels in the first and third registers are provided with digits arranged in the reverse of the usual order, and the machine is so set that, upon writing the present reading of the meter in the corresponding column, this number will be run into the second register, and, upon writing the previous reading in the next column of the bill, this number will be subtracted from the number previously run into the second register, thereby showing in the second register the amount consumed in the interval for which the charge is to be made. The number read from the second register is then typed in the "Consumption" column of the bill and subtracted out of the second register, and added into the first and third registers, due to the fact that in the first and third registers the digits on the dial-wheels extend around the latter in the reverse of the usual direction. It should be understood that the second register is cleared by this operation. Upon typing, in the last column of the bill, the number shown in the third register, this number will be subtracted out of the third register, thereby clearing the same, and will be added into the fourth register, in which such amounts are to be accumulated.

For the purpose of using a machine of standard construction, in which the registers have the same capacity, provision is made for converting the third and fourth registers into registers of lower denominations, by covering the wheel of lowest denomination in each of these registers by means of a shutter or the like. The covered dial may be brought into use again at will by sliding the shutter off.

Following the same general line of arrangement, a bookkeeping machine equipped as described may be used for other purposes, for example, in connection with preparing bills for electric service at $.10 per kilowatt-hour.

Other features and advantages will hereinafter appear.

In the accompanying drawings,

Figure 1 is a diagrammatic view showing parts of a bookkeeping machine of the Underwood-Hansen type of standard manufacture.

Figure 2 is a diagrammatic view indicating the manner in which the various items typed on the work-sheet are added into or subtracted out of the various registers.

Figure 3 is a view of the lower front part of the bookkeeping machine, showing at the right the registers from which, respectively, the amounts of the bills and the accumulations of said amounts may be read.

The invention is illustrated as used in the preparation of gas bills 11, each of which is provided, from left to right, with zones or columns 12 to 17, inclusive, to receive, respectively, the date of the last previous reading of the meter, the date of the present reading of the meter, the present reading of the meter, the previous reading of the meter, the amount consumed or the difference of the meter readings, and the amount of the bill. Preferably, the headings, "Present", "Previous", "Consumption", and "Amount" are provided for columns 14 to 17, inclusive.

In carrying out the invention, use may be made of an Underwood-Hanson bookkeeping machine provided with four standard registers 18, designated from left to right, respectively, as "Reg. 1", "Reg. 2", "Reg. 3", and "Reg. 4". Each of the registers usually includes nine dial or number wheels 19, from which the results of computations may be read through sight-openings 20 in the casing 21. Preferably, the spaces between groups of three number-wheels are considered as punctuation-spaces, and, as herein disclosed, these spaces are indicated by suitable markings 22 on the casing 21, adjacent the sight-openings 20.

Upon depression of a number-key 23, when the carriage is in a computing zone, a corresponding type-bar 25 will be swung upwardly and rearwardly, to cause a type 26 thereon to print on a work-sheet extending around the platen 27, which is rotatably mounted on the carriage 24. At the same time, if the number-key has a significant digit thereon, a pin-setting bar 28, corresponding to the significant digit on the number-key, will be depressed by means, not shown, to set an index-pin 29 of the proper value on a denominational pin-bar 30 which has been selected by the carriage 24. There is a pin-bar 30 for each dial-wheel 19 of each register, as indicated for "Reg. 1" in Figure 3.

To select the pin-bars 30, the carriage 24 is provided with denomination-selectors 31, settable at letter-space distances along the carriage and having tappets 32 at different positions from front to rear, so as to determine which set of jacks 33 is to be actuated thereby, the jacks for the different registers having their forward ends offset from front to rear. Upon engagement of a tappet 32 with a jack 33, the latter will be rocked about its pivot 34 to give a downward thrust to a rod 35, and, through a lever 36, a transposition linkage 37 and a bell-crank 38, advance the corresponding pin-bar 30 to permit a pin 29 to be set by one of the bars 28. Obviously, when the carriage is at rest in a computing zone, one of the pin-bars 30 of a corresponding group will be in advanced position, and the typing of a significant digit will cause the corresponding pin on the pin-bar to be set. No movement of the carriage by the usual escapement mechanism will take place until the pin has been set.

After a number to be computed in a given register has been typed and the digits thereof indexed by means of the pins 29 on the proper set or sets of pin-bars 30, the pin-bars are advanced by a general operator, not shown, in accordance with the setting of the pins and the number indexed on the pins is run into the register or registers. The bars 30 actuate the dial-wheels 19 by means of racks 39, at the forward ends of the bars 30, and pinions 40 meshing with the racks 39 and having the usual one-way connections with the dial-wheels 19. The mechanism, of which only a diagrammatic showing has been made, may be similar in general to the mechanism disclosed in the patent to F. A. Hart, No. 1,270,411, dated June 25, 1918, and the patent to O. Minton, No. 1,280,065, dated September 24, 1918.

The use of the bookkeeping machine in writing a bill is shown diagrammatically in Figure 2. The bill 11 is inserted around the platen 27 in the proper position longitudinally thereof, and the dates of the readings at the beginning and at the end of the period are typed in the first and second columns, respectively. After moving the carriage into the computing zone corresponding to the "Present" column, the reading "57,500" taken at the end of the period is typed, and, at the same time, due to the proper positioning of the selector 31 corresponding to the second register, the number is automatically indexed for addition on the pin-bars associated with the second or main register. After the completion of the indexing of the number, the dial-wheels on the second or main register are actuated in the usual manner in accordance with the pins indexed on the various pin-bars.

The carriage is then shifted to the left to a position to write in the "Previous" column the number "53,400", which represents the reading at the beginning of the period. As indicated in Figure 2, the machine is set for subtraction before the number is typed in this column, and, by means of a suitably positioned denomination-selector 31, having a tappet 32 in position to engage the jacks 33 for the second or main register, the number "53,400" is indexed for subtraction on the corresponding pin-bars, and, when the typing is completed, this number is subtracted in the usual manner, giving a reading on the dial-wheels of "4,100".

The carriage is then moved into the third zone corresponding to the "Consumption" column, as indicated in Figure 2, by means of properly-positioned selectors having tappets suitably positioned thereon. The number "4,100", typed in the "Consumption" column, will be indexed on the pin-bars for the second or main register and the third or special register of which use is made in ascertaining the required decimal number. (It is also indexed upon the first or quantity-accumulating register.) Upon completion of the typing of the number "4,100" and operation of the general operator, said number is subtracted, so that the second or main register is cleared. It will be understood that the machine is set for subtraction during the typing of the number 4,100 in the "Consumption" column. It is desired, however, to enter or index a decimal of this number in the third register. In obtaining the required result, the digits on the dial-wheels in the third register are arranged in the reverse of the usual order. (The same is true of the first register.)

The bill shown in Figure 2 is made out for gas sold at the rate of one dollar per thousand cubic feet, and it is desired to have the charge $4.10 show in the third or exhibiting register. This is effected by running the same digits into said special register, but with the digits showing in lower denominational orders respectively. In the special register, the right-hand punctuation-mark 22 is the decimal point. To convert the whole-number register into a decimal-noting register at will, a shutter 41 is supported for sliding movement on the casing 21 by screws 42 extending through a slot 43 in an extension 44 of the shutter, the slot being of sufficient length to permit the shutter to be moved to the left sufficiently to cover the digit of lowest denomination ordinarily seen through the sight-opening, and to be moved to the right to leave the dial-wheel of lowest denomination uncovered thereby and permit the register to be used in the ordinary manner whenever it is desired to use the entire register for whole numbers.

After running the charge or amount $4.10 into the third or exhibiting register, the carriage is shifted into the zone corresponding to the "Amount" column, and the reading in the exhibiting register is typed in this column. At the same time this number is automatically indexed for addition on the pin-bars corresponding to the third and fourth registers; the fourth register being used for accumulation of the charges. In view, however, of the fact that the digits on the dial-wheels of the third register are arranged in the reverse of the usual order, the running of the amount into the third register will cause it to be cleared. The charge is run into the fourth register additively at the same time that the third register is cleared. Obviously another shutter 41, similar to that used in connection with the third register, may be used in a standard machine in connection with the fourth register to convert it into a register of lower denominations. The three digits written in the last zone on the work-sheet co-operate with proper denomination-selectors.

It should be understood that the numbers typed in the "Consumption" columns of different bills are accumulated in the first register, and that the numbers typed in the "Amount" columns of the various bills are accumulated in the fourth register.

The invention may be utilized for many other kinds of work, such, for example, as the preparation of bills for electric service at the rate of ten cents per kilowatt-hour. Obviously, if the bill is for the same number of units as shown in Figure 2, the charge would be $410.00, and each of the denomination-selectors of these registers may be set two letter-spaces to the right of its usual position.

Variations may be resorted to within the scope of the invention, and portions of the improvements may be used without others.

Having thus described my invention, I claim:

1. In a register for a combined typewriting and computing machine, in combination, a plurality of denominational number-wheels, a sight through which results of computations may be read from said number-wheels, and means for varying the reading of the denominations of numbers exposed on said number-wheels in accordance with the uses of said register, said varying means comprising punctuation-indications, spaced at intervals to include three number-wheels, and a shutter shiftable to cover the lowest order digit wheel to indicate the desired position of the decimal point with reference to numbers displayed in said sight 2. In a combined typewriting and computing machine for preparing bills for gas sold at $1.00 per 1000 cubic feet, in combination, typewriting mechanism and computing mechanism controlled thereby, said computing mechanism including a register in which the amount of gas consumed is computed in cubic feet as a result of typing on a bill the present and previous readings of the meter, and a register in which the amount of the bill may be read after typing on the bill the number of cubic feet consumed, said last-mentioned register comprising dial-wheels arranged in groups of three with punctuation spaces therebetween, and a shutter to prevent digits on the right-hand dial-wheel from being read by the operator.

3. A register to be used in computing numbers in which the right-hand digit represents either a unit or 1/1000 of a unit, said register comprising dial-wheels in groups of three, with punctuation-indications between said groups, and a shutter movable to and from a position to permit reading of a digit on the next to the right-hand dial-wheel as the digit of lowest order.

4. The combination with a typing mechanism, of a reversible computing mechanism including a main register for whole numbers, a register comprising dials which are numbered in reverse order, said computing mechanism having provision for punctuation, means controlling said registers for entering the same digits in each and in the same denominations, and means shiftable at will for covering the dial of lowest denomination in the last-mentioned register, converting it into a decimal fraction exhibiting register having a lower range of denominations than the main register and with its two lower denominations pointed off.

5. The combination with a numeral typewriting mechanism, of a computing mechanism co-ordinated therewith and settable to either addition or subtraction, said computing mechanism including an initially cleared main register in which is ascertained by subtraction, and exhibited, the difference between amounts typed in two different zones, said mechanisms being so co-ordinated that upon the amount so exhibited in said register being typed in a third zone, said main register is cleared by subtraction, said computing mechanism also including an initially cleared register in which is automatically exhibited a decimal-fraction of the amount which is so typed in said third zone, the parts being co-ordinated to clear the last-mentioned register upon typing in a fourth zone the fraction that said last-mentioned register exhibits.

6. The combination with a numeral typewriting mechanism, of a computing mechanism co-ordinated therewith and settable to either addition or subtraction, said computing mechanism including an initially cleared main register in which is ascertained by subtraction, and exhibited, the difference between amounts typed in two different zones, said mechanisms being so co-ordinated that upon the amount so exhibited in said register being typed in a third zone, said main register is cleared by subtraction, said computing mechanism also including an initially cleared register in which is automatically entered digits the same as those subtracted from the main register to clear the same, but which digits are exhibited in a range of positions several denominations lower, the parts being co-ordinated to clear the last-mentioned register upon typing in a fourth zone the fraction that said last-mentioned register exhibits.

7. In a machine for typing successive entries in different zones across a bill and simultaneously effecting a corresponding computation, the combination of a main register for use in a succession of zones, an auxiliary register for use when the difference exhibited by the main register is copied by the operator into a special zone, and means to be effective in the special zone for clearing the main register and simultaneously exhibiting in said auxiliary register the product secured by multiplying the aforesaid exhibited difference by a predetermined decimal multiplier, said auxiliary register being always operative reversely of said main register.

8. In a machine for typing successive entries in different zones across a bill and simultaneously effecting a corresponding computation, the combination of a main register for use in a succession of zones, an auxiliary register for use when the difference exhibited by the main register is copied by the operator into a special zone, means to be effective in the special zone for clearing the main register and simultaneously exhibiting in said auxiliary register the product secured by multiplying the aforesaid exhibited difference by a predetermined decimal multiplier, said auxiliary register being always operative reversely of said main register and means dependent upon copying said result into still another zone, for clearing said auxiliary register.

9. In a machine having key-controlled means, including a carriage, for typing entries in successive zones across a bill and simultaneously effecting corresponding computations, the combination of a main register carriage-controlled means for shifting said main register from addition in one zone to subtraction in a second and a third zone, an auxiliary register also being shifted by the carriage from one state to another and means to be effective in the third zone for clearing the main register and simultaneously exhibiting in said auxiliary register the product secured by multiplying the difference exhibited by the main register by a predetermined decimal multiplier, said auxiliary register being always operative reversely of said main register.

10. In a machine having key-controlled means, including a carriage, for typing entries in successive zones, the combination of a main register, an auxiliary register, an accumulating register, means dependent upon the movement of the carriage for causing the main register to add in the first zone and subtract in the second and third zones, means for causing the auxiliary register to add in the third zone, means for causing the auxiliary register to subtract in the fourth zone, means for causing the accumulating register to add in the fourth zone, and denomination-selecting means controlled by said carriage and including means whereby each digit exhibited in the auxiliary register is made of a lower denomination than the digit simultaneously exhibited in the main register, for copying therefrom into the fourth zone, the auxiliary register having means indicating the punctuation point.

11. In a machine for preparing bills from meter-readings, in combination, typewriting mechanism and computing mechanism controlled thereby, said computing mechanism comprising a register, means for exhibiting upon said register the difference of two successively typed members, a second register also controlled by said typewriting mechanism, and a shutter for changing the apparent denominations of the number-wheels in said second register; so that, when the difference exhibited upon the first register is typed upon the bill, the charge, with proper indication of the decimal point, will be displayed upon the second register.

12. The combination with a denomination-selecting carriage, of a main register, and an auxiliary register for exhibiting the decimal product of the difference ascertained by the main register with a decimal multiplier, means being provided for exhibiting different denominations in the auxiliary register from those exhibited in the main register while said difference is being written, provision being made for indicating the correct punctuation of the product exhibited by the auxiliary register.

13. The combination with a typing mechanism, of a reversible computing mechanism including a main register for whole numbers and a decimal-fraction register comprising dials which are numbered in reverse order, means being provided for pointing off the two denominations at the right of said fraction register, means under the control of the typing mechanism and dependent upon the zone of typing, for running into the fraction register the digits subtracted out of the main register, and means for exhibiting said digits in a lower range of denominations, in said fraction register.

WALTER E. TORFS.